US011751156B2

(12) United States Patent
Thubert et al.

(10) Patent No.: US 11,751,156 B2
(45) Date of Patent: *Sep. 5, 2023

(54) DISTRIBUTED TIME SYNC IN A DIRECTED ACYCLIC GRAPH OF A TIME-SYNCHRONIZED NETWORK BASED ON CORRELATING TIMING INFORMATION FROM HIGHER NETWORK DEVICES

(71) Applicant: Cisco Technology, Inc., San Jose, CA (US)

(72) Inventors: Pascal Thubert, Roquefort les Pins (FR); Patrick Wetterwald, Mouans Sartoux (FR); Jean-Philippe Vasseur, Saint Martin d'Uriage (FR); Eric Michel Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,770

(22) Filed: Jul. 7, 2021

(65) Prior Publication Data

US 2021/0337493 A1 Oct. 28, 2021

Related U.S. Application Data

(63) Continuation of application No. 16/511,321, filed on Jul. 15, 2019, now Pat. No. 11,089,560.

(51) Int. Cl.
*H04W 56/00* (2009.01)
*G06F 16/901* (2019.01)
*G06F 9/4401* (2018.01)

(52) U.S. Cl.
CPC ...... *H04W 56/004* (2013.01); *G06F 16/9024* (2019.01); *H04W 56/002* (2013.01);
(Continued)

(58) Field of Classification Search
CPC ............ H04W 56/004; H04W 56/002; H04W 56/003; H04W 56/0065; G06F 16/9024; G06F 9/4401
See application file for complete search history.

(56) References Cited

U.S. PATENT DOCUMENTS 7,366,111 B2    4/2008   Thubert et al.
8,102,775 B2    1/2012   Thubert
(Continued)

OTHER PUBLICATIONS

Thubert et al., "IETF 6TSCH: Combining IPv6 Connectivity with Industrial Performance" [online], Jul. 2013, [retrieved on Nov. 9, 2017]. Retrieved from the Internet: <URL: https://www.researchgate.net/profile/Pascal_Thubert/publication/261430569_IETF_6TSCH_Combining_IPv6_Connectivity_with_Industrial_Performance/inks/56c4887c08ae7fd4625a28c8/IE I F-6TSCH-Combining-IPv6-Connectivity-with-Industrial-Performance.pdf?origin=publication_detail>, pp. 1-7.

(Continued)

*Primary Examiner* — Abdullahi Ahmed
(74) *Attorney, Agent, or Firm* — BEHMKE INNOVATION GROUP LLC; James M. Behmke; Jonathon P. Western

(57) ABSTRACT

In one embodiment, a method comprises: receiving, by a constrained wireless network device comprising a local clock, a plurality of messages from respective neighboring wireless network devices advertising as available parent devices in a directed acyclic graph of a time-synchronized network that is synchronized to a master clock device; determining, by the constrained wireless network device, a corresponding timing error of the local clock relative to each message output by the corresponding available parent device; and executing, by the constrained wireless network device, a distributed time synchronization of the local clock (Continued)

with the master clock device based on correlating the respective timing errors relative to the local clock.

20 Claims, 7 Drawing Sheets

(52) U.S. Cl.
CPC ..... *H04W 56/003* (2013.01); *H04W 56/0065* (2013.01); *G06F 9/4401* (2013.01)

(56) References Cited

U.S. PATENT DOCUMENTS

| | | | |
|---|---|---|---|
| 8,830,837 B2 | 9/2014 | Vasseur et al. | |
| 9,036,509 B1* | 5/2015 | Addepalli | H04W 52/0206 |
| | | | 701/1 |
| 9,485,157 B2 | 11/2016 | Thubert et al. | |
| 9,673,858 B2 | 6/2017 | Hui et al. | |
| 9,800,506 B2 | 10/2017 | Vasseur et al. | |
| 9,801,150 B2 | 10/2017 | Wetterwald et al. | |
| 10,298,346 B2 | 5/2019 | Thubert et al. | |
| 11,089,560 B2* | 8/2021 | Thubert | G06F 16/9024 |
| 2008/0247376 A1* | 10/2008 | Del Prado Pavon | |
| | | | H04W 52/0219 |
| | | | 370/345 |
| 2010/0226342 A1* | 9/2010 | Colling | H04W 56/002 |
| | | | 370/336 |
| 2015/0023363 A1* | 1/2015 | Hui | H04W 40/14 |
| | | | 370/408 |
| 2015/0244513 A1* | 8/2015 | Hartman | H04L 45/20 |
| | | | 370/350 |
| 2016/0150501 A1 | 5/2016 | Hui et al. | |
| 2016/0183205 A1* | 6/2016 | Li | H04W 56/001 |
| | | | 370/350 |
| 2017/0353292 A1 | 12/2017 | Thubert et al. | |
| 2020/0044689 A1* | 2/2020 | Paso | H04B 1/7156 |
| 2020/0136964 A1 | 4/2020 | Baddeley et al. | |
| 2021/0022098 A1 | 1/2021 | Thubert et al. | |

OTHER PUBLICATIONS

Hosni et al., "Adaptive k-cast scheduling for high-reliability and low latency in IEEE802.15.4-TSCH", [online] Lecture Notes in Computer Sciences, Aug. 2018, [retrieved on Jun. 25, 2019]. Retrieved from the Internet: <URL: https://www.researchgate.net/publication/327314084_Adaptive_k-cast_Scheduling_for_High-Reliability_and_Low-Latency_in_IEEE802154-TSCH_17th_International_Conference_on_Ad_Hoc_Networks_and_Wireless_ADHOC-NOW_2018_Saint-Malo_France_September_5-7_2018_Pro/download>, 13 pages.

Thubert, Ed., et al., "Reliable and Available Wireless Technologies", [online], RAW Internet-Draft, Jun. 6, 2019, [retrieved on Jun. 7, 2019], Retrieved from the Internet: URL: <https://tools.ietf.org/pdf/draft-thubert-raw-technologies-01.pdf>, pp. 1-20.

Vogli et al., "Fast network joining algorithms in Industrial IEEE 802.15.4 deployments", [online], Sep. 9, 2017 [retrieved on Jun. 10, 2019], Retrieved from the Internet: URL: <https://telematics.poliba.it/publications/2018/FastJoinTSCH.pdf>, pp. 1-35.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Watteyne, Ed., et al., "Using IEEE 802.15.4e Time-Slotted Channel Hopping (TSCH) in the Internet of Things (IoT): Problem Statement", Internet Engineering Task Force (IETF), Request for Comments: 7554, May 2015, pp. 1-23.

Vilajosana, Ed., et al., "Minimal IPv6 over the TSCH Mode of IEEE 802.15.4e (6TiSCH) Configuration", Internet Engineering Task Force (IETF), Request for Comments: 8180, May 2017, pp. 1-28.

Roche, "Time Synchronization in Wireless Networks", [online], Apr. 23, 2006, [retrieved on Jun. 10, 2019]. Retrieved from the Internet: <URL: from https://www.cse.wustl.edu/~jain/cse574-06/ftp/time_sync/index.html>, pp. 1-12.

TTTECH, Time-Inggered Ethernet—A Powerful Network Solution for Multiple Purpose , [online], [retneved on Feb. 11, 2016]. Retrieved from the Internet: <URL: https://www.tttech.com/download/technologies/deterministic-ethernet/time-triggered-ethernet/?file=%2Ffileadmin%2Fcontent%2Fgeneral%2Fsecure%2FTTEthernet%2FTTTech_TTEthernet_Technical-Whitepaper.pdf&hash=0560afac568e8db0ee899519f1f95b4b&eID=fileDownload>, pp. 1-14.

Vera-Perez et al., "A Joining Procedure and Synchronization for TSCH-RPL Wireless Sensor Networks", [online], Sensors 2018, 18, [retrieved on May 8, 2019]. Retrieved from the Internet: <URL: https://www.ncbi.nlm.nih.gov/pmc/articles/PMC6210796/pdf/sensors-18-03556.pdf>, pp. 1-20.

Thubert et al., U.S. Appl. No. 16/451,098, filed Jun. 25, 2019.
She et al., U.S. Appl. No. 16/004,245, filed Jun. 8, 2018.

* cited by examiner

DISTRIBUTED TIME SYNC IN A DIRECTED ACYCLIC GRAPH OF A TIME-SYNCHRONIZED NETWORK BASED ON CORRELATING TIMING INFORMATION FROM HIGHER NETWORK DEVICES

This application is a continuation of application Ser. No. 16/511,321, filed Jul. 15, 2019.

TECHNICAL FIELD

The present disclosure generally relates to distributed time synchronization in a directed acyclic graph (DAG) of a time-synchronized network based on correlating timing information from higher network devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale low power and lossy networks (LLNs) rely on reliable time synchronization between wireless resource-constrained (e.g., low-power) network devices (also referred to herein as Low Power and Lossy Network (LLN) devices). For example, LLNs allow a large number (e.g., tens of thousands) of resource-constrained devices to be interconnected to form a wireless mesh network, based on deployment using wireless link layer protocols such as IEEE 802.15.4e Time Slotted Channel Hopping (TSCH) over Internet Protocol version 6 (IPv6), also referred to as "6TiSCH"; such large-scale LLNs can be used for deployment of, for example, a connected grid mesh (CG-mesh) network advanced metering infrastructure (AMI).

LLN devices suffer from the problem of encountering difficulty in maintaining synchronization with neighboring LLN devices, hence the loss of synchronization can cause a "lost" LLN device to initiate a "restart" or "reboot" operation to attempt resynchronizing with a neighboring LLN device: hence, an entire subtree of the LLN may be lost during the "restart" operation of the "lost" LLN device acting as parent of the subtree; moreover, since neighboring LLN devices can have a relatively long sleep interval (e.g., hours or days), use of a randomized search in the "reboot" may cause the "lost" LLN device to continue its resynchronization for days or weeks before resynchronizing with the LLN.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
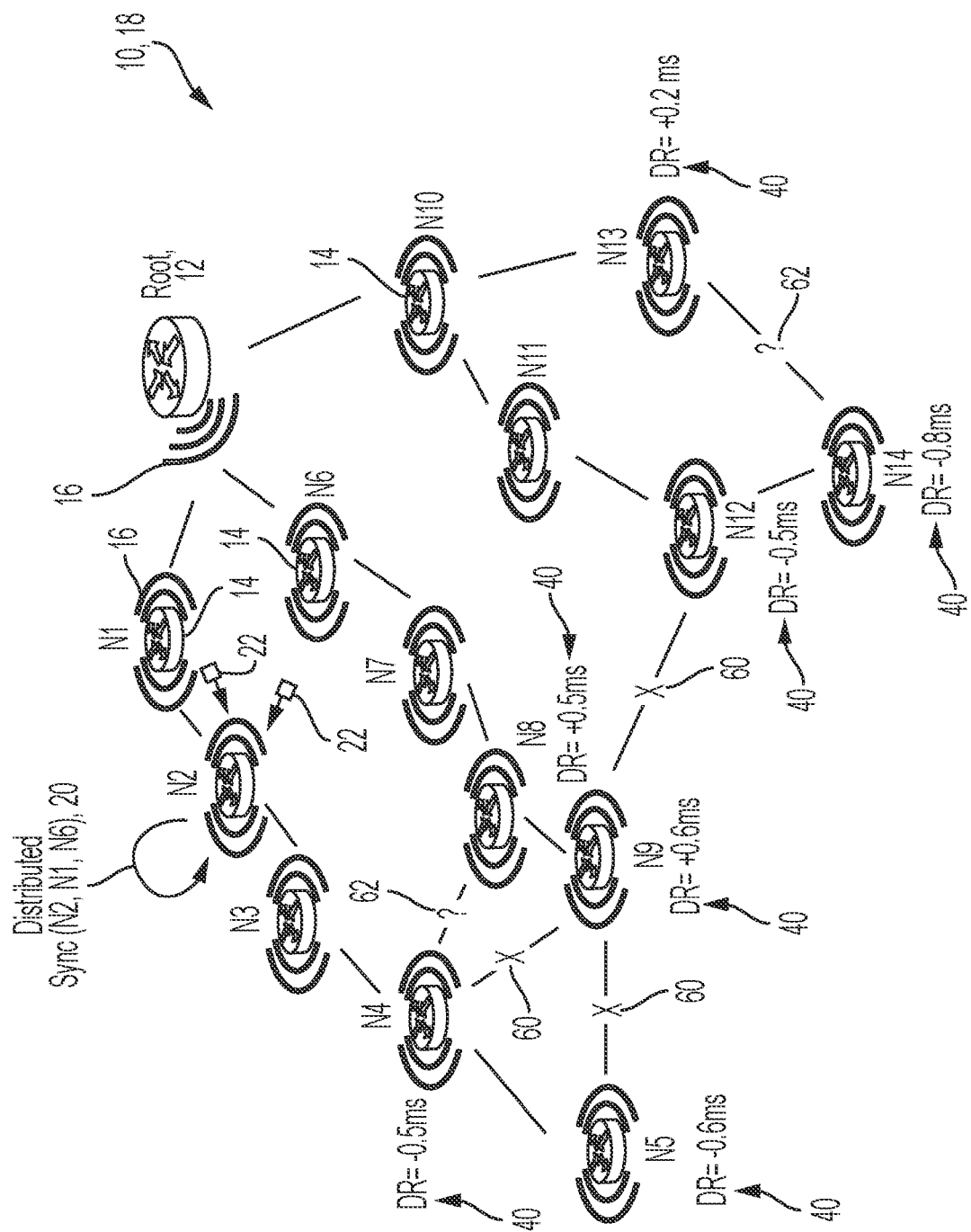
FIGS. 1A and 1B illustrate an example system having constrained network devices for executing distributed time synchronization of a local clock based on correlating respective timing errors determined relative to neighboring available parent devices, according to an example embodiment.

In one embodiment, a method comprises: receiving, by a constrained wireless network device comprising a local clock, a plurality of messages from respective neighboring wireless network devices advertising as available parent devices in a directed acyclic graph of a time-synchronized network that is synchronized to a master clock device; determining, by the constrained wireless network device, a corresponding timing error of the local clock relative to each message output by the corresponding available parent device; and executing, by the constrained wireless network device, a distributed time synchronization of the local clock with the master clock device based on correlating the respective timing errors relative to the local clock.

In another embodiment, an apparatus is implemented as a physical machine and comprises non-transitory machine readable media, a local clock, a device interface circuit, and a processor circuit. The non-transitory machine readable media is configured for storing executable machine readable code. The apparatus is implemented as a constrained wireless network device. The device interface circuit is configured for receiving a plurality of messages from respective neighboring wireless network devices advertising as available parent devices in a directed acyclic graph of a time-synchronized network that is synchronized to a master clock device. The processor circuit is configured for executing the machine readable code, and when executing the machine readable code operable for: determining a corresponding timing error of the local clock relative to each message output by the corresponding available parent device; and executing a distributed time synchronization of the local clock with the master clock device based on correlating the respective timing errors relative to the local clock.

In another embodiment, or more non-transitory tangible media is encoded with logic for execution by a machine and when executed by the machine operable for: receiving, by the machine implemented a constrained wireless network device comprising a local clock, a plurality of messages from respective neighboring wireless network devices advertising as available parent devices in a directed acyclic graph of a time-synchronized network that is synchronized to a master clock device; determining, by the constrained wireless network device, a corresponding timing error of the local clock relative to each message output by the corresponding available parent device; and executing, by the constrained wireless network device, a distributed time synchronization of the local clock with the master clock device based on correlating the respective timing errors relative to the local clock.

DETAILED DESCRIPTION

Particular embodiments enable a constrained wireless network device (also referred to as an "LLN device") to execute a distributed time synchronization of its local clock with a master clock device that establishes a time-synchronized network, for example a 6TiSCH network or a Time Triggered network.

Figure 1B:
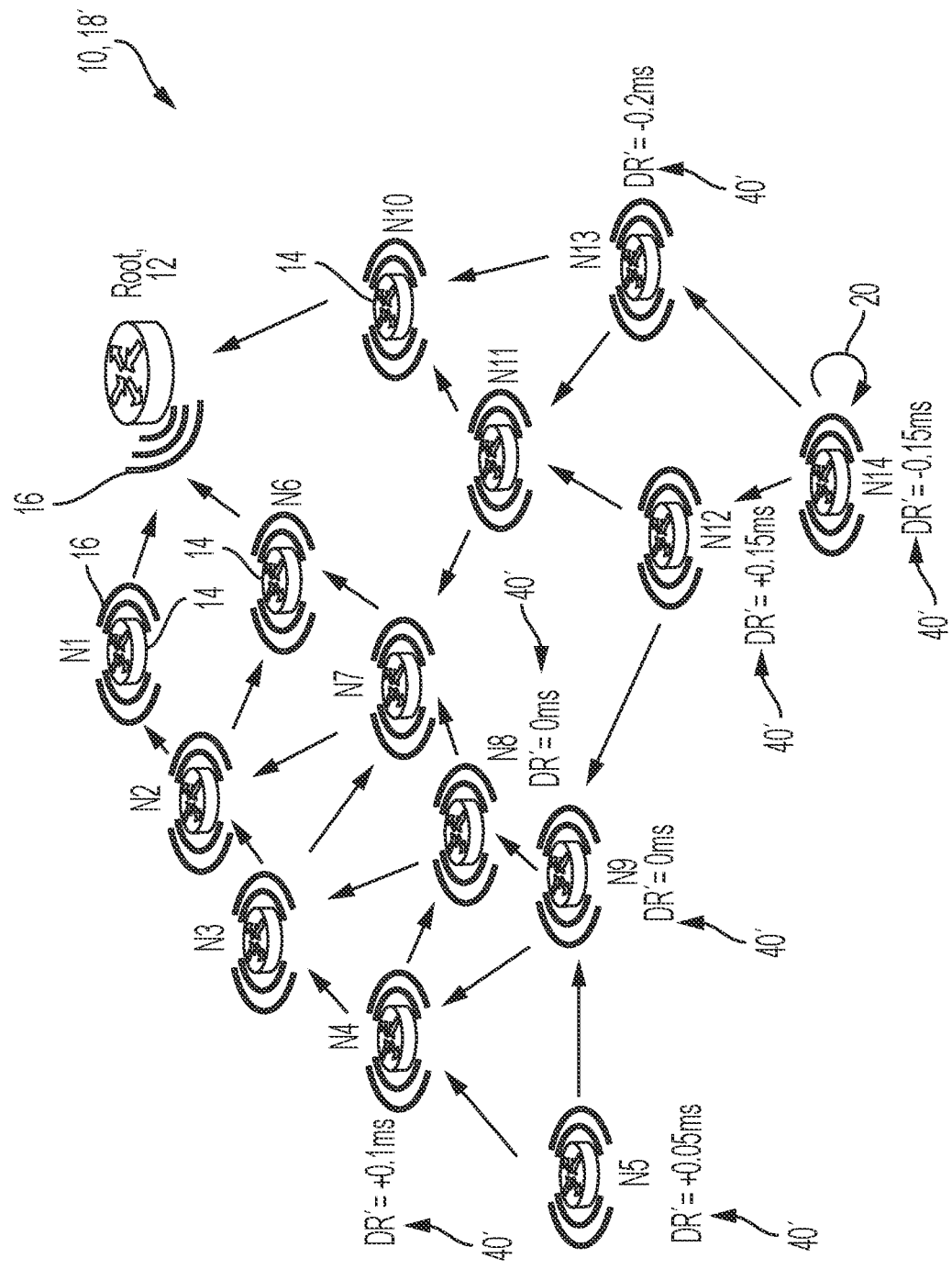

FIGS. 1A and 1B illustrates an example wireless mesh data network 10, for example an IEEE 802.15.4e/g based low powered and lossy network (e.g., a CG-mesh network) having a root mesh network device 12 configured for operating as a directed acyclic graph (DAG) root for multiple wireless mesh network devices (e.g., "N1" through "N14") 14 via wireless data links 16, according to an example embodiment. The root network device 12 can be implemented, for example, as a commercially-available Cisco® 1000 Series Connected Grid Router (CGR) from Cisco Systems, San Jose, Calif., that is modified as described herein; hence, the root mesh network device 12 also is referred to as a CGR 12 or DAG root 12, or a root network device "CGR" 12.

The root network device 12 can operate as a master clock device of a directed acyclic graph (DAG) 18 that enables the LLN devices (e.g., "N1", "N6", and "N10") 14 to attach as child network devices to the root network device 12, and enables the attached LLN devices (e.g., "N1", "N6", and "N10") 14 to advertise as available parent devices for other neighboring LLN devices (e.g., "N2", "N7", "N11", and "N13") 14 attempting to join the DAG 18.

The root network device 12 can serve as a "sink" for the wireless mesh network devices 14; for example, the root network device 12 enables the wireless mesh network devices 14 to reach one or more locally-reachable computing devices via a backbone link (not shown), and/or one or more remote devices (not shown) (e.g., an authenticated software update provider, certificate authority, a head-end device for sending or receiving data packets, etc.). The root network device 12 or another locally-reachable device can be implemented as a network manager, for example a central path computation element (PCE) that can compute and install a track allocating a sequence of cells, according to a 6TiSCH architecture, for each hop along a path from a source to a destination. For example, 6TiSCH transmission protocol specifies a repeating Channel distribution/usage (CDU) matrix of "cells", each cell representing a unique wireless channel at a unique timeslot. The CDU is partitioned into prescribed "chunks", each chunk comprising multiple cells distributed in time and frequency (i.e., a different channel each timeslot). The 6TiSCH architecture specifies that a RPL parent device (described below) can allocate cells within an appropriated chunk to its first-hop child devices within its interference domain.

As illustrated in FIG. 1, each wireless mesh network device 14 in the wireless mesh data network 10 can establish a link layer mesh topology via wireless data links 16. Each wireless mesh network device 14 can be implemented as a constrained network device, or "LLN device" or "CG-mesh" device, configured for operating for example as a RPL node according to the Internet Engineering Task Force (IETF) Request for Comments (RFC) 6550. Hence, each wireless mesh network device 14 can establish a tree-based network topology 18 overlying the wireless mesh data network 10, described below, that is rooted at the root network device 12. Each of the network devices 12, 14, in the wireless mesh data network can be configured for transmitting data packets in periodically-repeating assigned time slots, for example according to a wireless time-slotted transmission protocol that can optionally utilize frequency hopping such as 6TiSCH, for example according to the IETF RFC 8180, entitled "Minimal IPv6 over the TSCH Mode of IEEE 802.15.43 (6TiSCH) Configuration".

The root network device 12 can be configured for causing creation of a tree-based topology overlying the link layer mesh data network 10 based on transmitting one or more DODAG information object (DIO) messages during scheduled time slots, for example according to RFC 6550 and RFC 8180. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a wireless mesh network device 14 also can be referred to herein as a "RPL node" or a wireless network device. Each RPL node 14 in the LLN typically is constrained by processing power, memory, and energy (e.g., battery power); interconnecting wireless data links 16 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) 18 toward the root network device 12, where all routes in the LLN terminate at the root network device 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., node "N14" or beyond) at scheduled time slots according to RFC 8180.

The DODAG 18 can be formed based on a DODAG information object (DIO) advertised by the DAG root 12, where a "child" network device (e.g., "N1") 14 detecting the DIO at a scheduled time slot can select the DAG root 12 as a parent in the identified DODAG based on comparing network topology metrics (advertised in the DIO) to a prescribed objective function of the RPL instance. The "child" network device (e.g., "N1") 14, upon attaching to its parent, can output its own DIO at a scheduled time slot with updated network topology metrics that enable other wireless mesh network devices 14 to discover the DODAG, learn the updated network topology metrics, and select a DODAG parent.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless mesh network devices 14 connected exclusively within the PAN according to the DIO messages originated by the corresponding one DAG root 12. Hence, unless explicitly stated otherwise herein, a wireless mesh network device 14 is configured to belong to only one PAN at a time, i.e., a wireless mesh network device 14 is configured to be attached only within one DODAG, although the wireless mesh network device 14 can be configured for attachment to one or more parent network devices 14 within a single DODAG.

Downward routes (i.e., away from the DAG root) can be created based on Destination Advertisement Object (DAO) messages that are created by a wireless mesh network device 14 and propagated toward the DAG root 12 at scheduled time slots. The RPL instance can implement downward routes in the DAG of the LLN in either a storing mode only (fully stateful), or a non-storing mode only (fully source routed by the DAG root), or a combination thereof (e.g., some parent network devices operate in storing mode and one or more child network devices operate in non-storing mode only). In storing mode, a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Each mesh network device 14 in the wireless mesh data network 10 can be configured for operating in storing mode, non-storing mode, and/or a combination thereof. Hence, each wireless mesh network device 14 can unicast transmit its DAO message to its parent (and/or the DAG root 12) in accordance with RFC 6550 and/or RFC 8180. The DAG root 12, in response to receiving the DAO messages from the RPL nodes 14, can build the entire DAG topology and store the DAG topology in its memory circuit 34 (illustrated in FIG. 2), including storage of heuristics of usage, path length, knowledge of device capacity, link reliability, etc.

A wireless mesh network device 14 can operate as a parent network device (e.g., "N2" of FIG. 1) for an attached "child" RPL node (e.g., "N3"). For example, in response to a parent network device "N2" receiving a data packet originated by its child network device "N3" 14, the parent network device "N2" can cache a downward path (i.e., away from the DAG root 12) that the target device "N3" 14 is reachable via a given egress interface on the parent device "N2" (e.g., output to an IPv6 address "2::3" that is the attachment address of the target device "N3"); the next parent network device "N1", in response to receiving the data packet from its child RPL node "N2", can cache the downward path that the target device "N3" 14 is reachable via the child RPL node "N2".

Hence, each of the parent network devices "N1", "N2", etc. 14 can execute a caching (e.g., a transient caching on a temporary basis) of a downward path (i.e., away from the DAG root 12) for reaching the target network device "N3" 14, independent of any route table entry in the parent network device; moreover, a common parent device (e.g., "N7" of FIG. 1B) 14 can cache downward paths toward multiple "target devices" (e.g., network devices "N9" and "N12") within its sub-DAG, such that a data packet originated by one RPL node "N9" and destined toward another RPL node "N12" can be forwarded by the common parent device (e.g., "N7") to the corresponding parent device "N11" of the destination target "N12" eliminating the necessity that the data packet be forwarded via the default route toward the DAG root 12.

Figure 2:
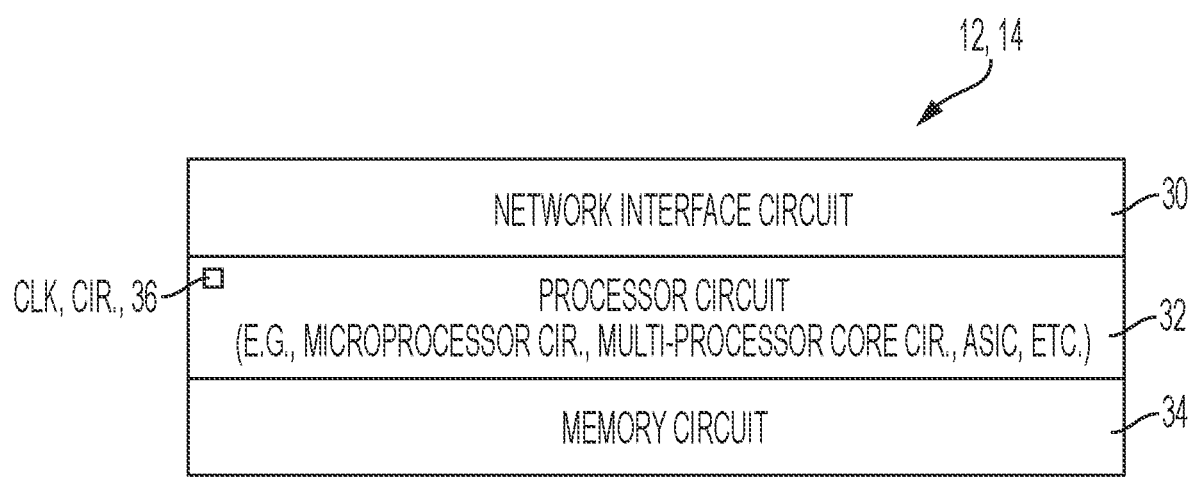
FIG. 2 illustrates an example of any one of the network devices of FIGS. 1A and 1B, according to an example embodiment.
Figure 3:
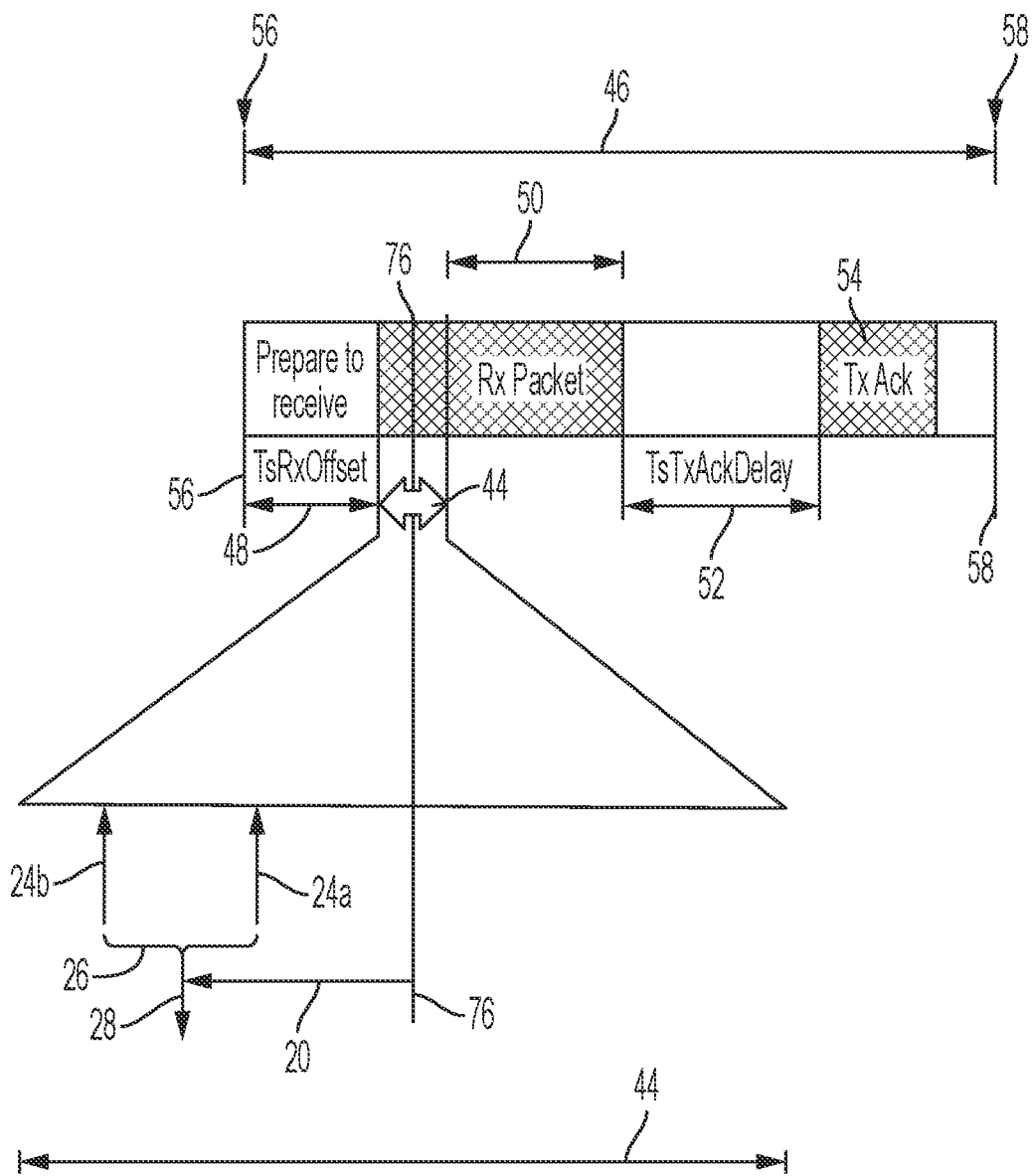
FIG. 3 illustrates an example of distributed time synchronization based on correlating respective timing errors determined relative to neighboring available parent devices, according to an example embodiment.

According to an example embodiment, each LLN device (e.g., "N2") 14 can execute a distributed time synchronization 20 of its corresponding local clock (36 of FIG. 2), with the master clock device implemented in the root network device 12, based on the LLN device (e.g., "N2") 14 determining timing errors (e.g., 24a, 24b of FIG. 3) of its local clock relative to data packets 22 received from respective neighboring wireless network devices (e.g., "N1", "N6") advertising as available parent devices in the DAG 18: as described in further detail below with reference to FIG. 3, each LLN device (e.g., "N2") 14 can correlate (26 of FIG. 3) the respective timing errors (e.g., 24a, 24b of FIG. 3) relative to its corresponding local clock 36 (illustrated in FIG. 3 as an estimated transmit start instance 76 in a receive slot time 46), for example based on determining a statistical mean (e.g., "average") 28 of the timing errors 24a, 24b relative to its local clock 36 (e.g., the estimated transmit start instance 76); each LLN device (e.g., "N2") 14 can execute the distributed time synchronization 20 of its local clock (e.g., the estimated transmit start instance 76) to the statistical mean 28 that identifies for the LLN device (e.g., "N2") 14 the most probable position of the master clock device relative to the local clock.

Hence, the particular embodiments enable a constrained wireless network device (e.g., "N2") 14 to execute a distributed time synchronization 20 based on determined timing errors 24 of its local clock relative to two or more available parent devices (e.g., "N1", "N6") 14: the distributed time synchronization 20 substantially improves over prior synchronization attempts that relied on a single parent device for synchronization in the DAG 18. Hence the term "distributed synchronization" refers to a constrained wireless network device using multiple "sources" (e.g., different neighboring network devices) to determine respective timing errors of its own local clock relative to the respective clocks of the different neighboring network devices, where the multiple "sources" can output respective data packets 20 that enable the constrained wireless network device to determine the respective timing errors.

Moreover, the constrained wireless network device (e.g., "N2") 14, having executed the distributed time synchronization 20 of its local clock and having joined the DAG 18, can operate as a corresponding available parent device in FIG. 1A for other child network devices (e.g., "N3", "N7") 14 attempting to join the DAG 18. As illustrated in FIG. 1B, the example embodiments enable the synchronization among network devices in the DAG to form a "fabric" of synchronization across the DAG topology (i.e., transverse across the DAG) that preserves synchronization in the time-synchronized network (e.g., 6TiSCH), as opposed to relying on a strict tree-type synchronization that can introduce larger timing errors as the distance between an LLN device and the root master clock device increases.

In particular, FIG. 1A illustrates the DAG 18 having established the tree-based topology, but before the distributed time synchronization 20 is implemented throughout the time-synchronized wireless mesh data network 10. A particular requirement of each of the constrained LLN devices 14 is the ability to maintain the strict timing requirements of a prescribed listening interval, according to the wireless time-slotted transmission protocol (e.g., 6TiSCH), in order to avoid losing synchronization with a neighboring LLN device.

FIG. 3 illustrates a prescribed receive slot time 46 having a receive slot initiation instance 56 and a receive slot termination instance 58. The prescribed received time slot 46 has a prescribed (i.e., fixed) duration and includes a prescribed "prepare to receive" interval (e.g., "TxRxOffset") 48, a prescribed listening interval defined by the prescribed packet guard time (PGT) 44, followed by a prescribed remaining packet reception interval 50 for receiving a transmitted data packet (assuming the prescribed transmission activity (e.g., preamble) is detected during the prescribed listening interval 42), a prescribed acknowledgment message transmission delay interval ("TsTxAckDelay") 52 following the remaining packet reception interval 50, followed by a prescribed ack transmission interval 54 reserved for transmission of an acknowledgment message in response to successful transmission of the data packet during the remaining packet reception interval 50.

Hence, the receive slot time 46 begins at the receive slot initiation instance 56 with initiation of the "prepare to receive" interval ("TsRxOffset") 48, and the receive slot time 46 ends at the receive slot termination instance 58 following completed transmission of the acknowledgment message during the receiver ack transmission interval 54. Example time values for the above identified receive slot time 46 (and associated transmit slot intervals) are illustrated in RFC 8180 at Appendix A2. The time value for the prescribed PGT 44 can be set, for example by an administrator via a PCE.

As illustrated in FIG. 3, each constrained LLN device 14 listening for a data packet 22 according to the prescribed wireless time-slotted transmission protocol (e.g., 6TiSCH) may be required to listen, within a prescribed listening interval defined by a prescribed PGT 44, for a prescribed transmission activity (e.g., a preamble sequence of alternating "1"s and "0"s at the beginning of a link layer data packet that enables the receiver PHY to "lock" onto the transmitted bit stream at the beginning of the transmitted data packet). The prescribed time-based guard time 44 is established by the wireless time-slotted transmission protocol to accommodate time-based variations between the actual transmit start instance (e.g., 24a) of a transmitted data packet 22 by the transmitting network device (e.g., "N1" using its corresponding clock), and the estimated transmit start instance 76 as estimated by the receiving network device ("N2" using its corresponding clock); hence, receiving LLN device (e.g., "N2") is configured for centering the prescribed guard time 44 at its estimated transmit start instance 76 to optimize timing variations between the estimated transmit start instance 76 and the actual transmit start instance (e.g., 24a). Moreover, an LLN device may be required to return to a sleep state if the prescribed transmission activity (e.g., the preamble of a data packet) is not detected within prescribed guard time 44 as clocked by the local clock 36 in the receiving LLN device (e.g., "N2").

However, the clock circuit 36 of each constrained LLN device 14 can have incrementally-increasing errors (e.g., "drift") over time due to the relatively low-cost clock circuit 36 that is implemented in the constrained LLN device 14, and also due to the relatively harsh environmental conditions encountered by the constrained LLN devices 14. Moreover, the drift relative to the root network device 12 (e.g., the drift relative to the root "DR" 40) can increase in each constrained LLN device 14 as the distance to the root network device 12 increases by hop count.

For example, assume with respect to FIG. 1A that the constrained LLN device "N1" can have a −0.1 millisecond delay (−0.1 ms) relative to its parent, namely the root network device 12; assume that prior to any distributed time synchronization 20, the constrained LLN devices "N2", "N3", "N4" and "N5" 14 have the respective drift delay values (relative to their corresponding parent LLN in the DAG 18) of −0.2 ms, 0.0 ms, −0.2 ms, and −0.1 ms. Hence, the constrained LLN device "N4" 14 would have a corresponding cumulative delay 40 relative to the root of "N4DR=−0.5 ms" 40 (based on summing its parent-delay value with the delay values of its respective parent devices "N3", "N2", and "N1"), and the constrained LLN device "N5" 14 would have a corresponding cumulative delay 40 relative to the root of "N5DR=−0.6 ms" 40. Hence, even though the constrained LLN device "N5" 14 has a drift of −0.1 ms with respect to its parent network device "N4", the synchronization along the linear chain of "Root N1 N2 N3 N4 N5" still causes the constrained LLN device "N4" 14 to have a drift relative to the root 40 of "N4DR=−0.5 ms", and the constrained LLN device "N5" 14 to have a drift relative to the root 40 of "N5DR=−0.6 ms".

Assume further that prior to any distributed time synchronization 20, the constrained LLN devices "N6", "N7", "N8", and "N9" 14 have the respective drift delay values (relative to their corresponding parent LLN in the DAG 18) of +0.1 ms, +0.2 ms, +0.2 ms, and +0.1 ms. Hence, the constrained LLN device "N8" 14 would have a corresponding cumulative delay 40 relative to the root of "N8DR=+0.5 ms" 40 (based on summing its parent-delay value with the delay values of its respective parent devices "N7" and "N6"), and the constrained LLN device "N9" 14 would have a corresponding cumulative delay 40 relative to the root of "N9DR=+0.6 ms" 40 despite synchronization via the linear chain of "Root-N6-N7-N8-N9".

Assume further that prior to any distributed time synchronization 20, the constrained LLN devices "N10", "N11", "N12", "N13", and "N14" 14 have the respective drift delay values (relative to their corresponding parent LLN in the DAG 18) of −0.1 ms, −0.2 ms, −0.2 ms, +0.3 ms, and −0.3 ms. Hence, the constrained LLN device "N12" 14 would have a corresponding cumulative delay 40 relative to the root of "N12DR=−0.5 ms" 40, the constrained LLN device "N14" 14 would have a corresponding cumulative delay 40 relative to the root of "N14DR=−0.8 ms" 40 despite synchronization via the linear chain of "Root-N10-N11-N12-N14", and the constrained LLN device "N13" 14 would have a corresponding cumulative delay 40 relative to the root of "N13DR=+0.2 ms" 40 despite synchronization via the linear chain of "Root-N10-N13".

Hence, if the root network device 12 deployed a wireless time-slotted transmission protocol that specified a prescribed guard time 44 of one millisecond (1 ms) ("PGT=1 ms"), then even though each constrained LLN device (e.g., "N9") may have relatively minimal drift relative to its preferred parent network device (e.g., "N8"), the differences in drift relative to the root ("DR") can increase in constrained LLN devices 14 positioned further from the root in the DAG 18 due to the cumulative drift among the increasing number of network devices (i.e., hop count) between the constrained LLN device (e.g., "N9") and the root network device 12 implementing the master clock device.

Hence, a constrained LLN device (e.g., "N9") can encounter a "wall of time" that creates a blockage 60 (illustrated by an "X" in FIG. 1A) in detecting any transmissions from a neighboring constrained LLN device (e.g., "N4", "N5", or "N12") (and vice versa) due to the differences in the drifts relative to the root (DR) 40 exceeding the prescribed guard time 44 of "PGT=1 ms". As illustrated in FIG. 1, the drift relative to the root "N9DR=+0.6 ms" of the constrained LLN device "N9" has a difference of greater than the prescribed guard time 44 of "PGT=1 ms" for any one of the neighboring LLN devices "N4" ("DR=−0.5 ms), "N5" ("DR=−0.6 ms), or "N12" ("DR=−0.5 ms).

Hence, none of the constrained LLN devices "N4", "N5", or "N12" 14 are able to "see" the constrained LLN device "N9" 14 due to the respective differences in the drift relative to the root (DR) 40 exceeding the prescribed PGT 44.

The imposition of the prescribed guard time 44 of "PGT=1 ms" also can result in unreliable communications 62 (illustrated by a "?" in FIG. 1A) between the constrained LLN devices "N4" and "N8", and between the constrained LLN devices "N13" and "N14", due to the differences in their respective drifts relative to the root (DR) 40 being equal to the prescribed PGT 44; hence, any minute variation/jitter in the clock circuit 36 could cause the constrained LLN devices "N4" and "N8" (or "N13" and "N14") to temporarily lose communications.

Hence, a constrained LLN device 14 can suffer a "wall of time" that causes the constrained LLN device to lose synchronization with a neighboring device if the "drift" is sufficient that the constrained LLN device cannot detect the prescribed transmission activity (e.g., the preamble sequence) within the specific prescribed guard time, even though: (1) transmission has already started but the constrained LLN device was too late in initiating its prescribed listening interval and detecting the prescribed transmission activity, and therefore cannot synchronize to the bit stream in the transmitted data packet; or (2) the constrained LLN device executed its prescribed listening interval too early and was forced to go back to a sleep state just as the transmitting network device began transmission of the prescribed transmission activity at the beginning of the data packet transmission.

The above-described "wall of time" resulting in loss of synchronization also can be encountered more often in LLN devices 14 that require relatively long "sleep" intervals due to substantially long deployment requirements (e.g., 10 years or more) using constrained battery resources (limited Amp-Hours (AH)). In particular, LLN devices 14 can encounter difficulty in maintaining synchronization with neighboring LLN devices, because each LLN device (e.g., sensor node, "dust" node, etc.) 14 typically is implemented with a low-cost crystal that invariably encounters varying short-term and long-term drift in generation of a reference clock; however, each LLN device 14 also is implemented with a low-cost (resource-constrained) battery that may require the LLN device to have relatively long "sleep" intervals (e.g., hours or days) as opposed to relatively short "active" intervals for transmission and/or reception of data packets (e.g., seconds or less), i.e., the LLN device is only permitted to wake up when "strictly necessary" (e.g., transmit or receive a data packet) in order to minimize energy consumption and/or network duty cycle. As described previously, an LLN device typically is required to return to a sleep state if a data packet preamble is not detected within the prescribed listening interval that is limited by the prescribed guard time (generated based on the reference clock in the LLN device).

Consequently, instances can arise where an LLN device can lose synchronization with a neighboring LLN device because the LLN device cannot detect (within a "detection window" based on its corresponding "receiving" reference clock) a data packet preamble transmitted by a neighboring LLN device (initiated at a "transmit start instance based on its corresponding "transmitting" reference clock). This loss of synchronization can cause the LLN device to become "lost" in the LLN network and initiate a "restart" or "reboot" operation to resynchronize itself in the LLN. The resynchronizing operations can result in substantially long recovery times, as the lost LLN node and the neighboring node may no longer be aligned with respect to time or transmission/reception frequencies, such that a beacon could be transmitted on one channel frequency, while the lost LLN node is listening on a different channel frequency.

Further, even if a constrained LLN device 14 does not lose synchronization with its preferred parent network device (as in FIG. 1A), the existence of "walls"/blockages 60 or unreliable communications 62 limits the robustness and resiliency of the DAG 18, since the constrained LLN devices 14 further from the root are able to only form a tree-based topology (relying on a single parent to attach to the DAG 18), as opposed to a more robust DAG where most child network device can rely on communicating with a second alternate parent, according to the wireless time-slotted transmission protocol implemented in the time-synchronized wireless mesh data network 10 if the preferred parent is unavailable.

As illustrated in FIG. 1B and described in further detail below, each constrained LLN device 14 can execute the distributed time synchronization 20 that enables the constrained LLN device 14 to synchronize its local clock with the master clock device (implemented, for example, in the root network device 12). As illustrated in FIG. 3, the execution of the distributed time synchronization 20 enables a constrained LLN device (e.g., "N14") to shift its estimated transmit start instance 76 to the statistical mean 28 of the timing errors 24, in substantial alignment with the master clock device. As illustrated in FIG. 1B, the execution of the distributed time synchronization 20 by each of the constrained LLN devices 14 can substantially reduce the corresponding drift relative to the root (DR') 40' to ensure that each of the differences in the drift relative to the root (DR') 40' are within the prescribed PGT 44 of "PGT=1 ms". As illustrated in FIG. 1B, the respective values of the adjusted drift relative to the root (DR') 40' for the constrained network devices "N4", "N5", "N8", "N9", "N12", "N13", and "N14" are "N4DR'=+0.1 ms", "N5DR'=+0.05 ms", "N8DR'=0.0 ms", "N9DR'=0.0 ms", "N12DR'=+0.15 ms", "N13DR'=−0.2 ms", and "N4DR'=−0.15 ms".

Hence, the example embodiments enable the DAG 18' to form a "fabric" of synchronized constrained LLN devices 14 ensuring greater stability throughout the time-synchronized wireless mesh data network 10, as the constrained LLN devices further from the root network device 12 can still "see" each other within the prescribed PGT 44 and thus establish multiple parent attachments in the DAG 18'.

FIG. 2 illustrates an example implementation of any one of the devices 12 and/or 14 of FIG. 1, according to an example embodiment. Each device 12 and/or 14 is a physical machine (i.e., a hardware device) configured for communications with any other device 12 and/or 14.

Each apparatus 12 and/or 14 can include a device interface circuit 30, a processor circuit 32, a memory circuit 34, and a clock circuit 36. The device interface circuit 30 can include one or more distinct physical layer transceivers for communication with any one of the other devices 12 and/or 14; the device interface circuit 30 also can include an IEEE based Ethernet transceiver for communications with the devices of FIG. 1 via any type of data link (e.g., a wired or wireless link, an optical link, etc.), for example a wireless IEEE 802.15.4e/g data link implemented in accordance with RFC 8180. For example, the root network device 12 can have a wired transceiver for communications via a backbone link (not shown), and a wireless transceiver for communication with the wireless mesh network devices 14. Each computing device 16 and the security device can have a wired transceiver for communications via the backbone link 18, and optionally a wireless transceiver. Each wireless mesh network device 14 can include one or more wireless transceivers.

The processor circuit 32 can be configured for executing any of the operations described herein, and the memory circuit 34 can be configured for storing any data or data packets as described herein. The term "configured for" or "configured to" as used herein with respect to a specified operation refers to a device and/or machine that is physically constructed and arranged to perform the specified operation.

Any of the disclosed circuits of the devices 12 and/or 14 (including the device interface circuit 30, the processor circuit 32, the memory circuit 34, the clock circuit 36, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

FIG. 3 illustrates an example of distributed time synchronization based on correlating respective timing errors determined relative to neighboring available parent devices, according to an example embodiment.

Figure 4A:
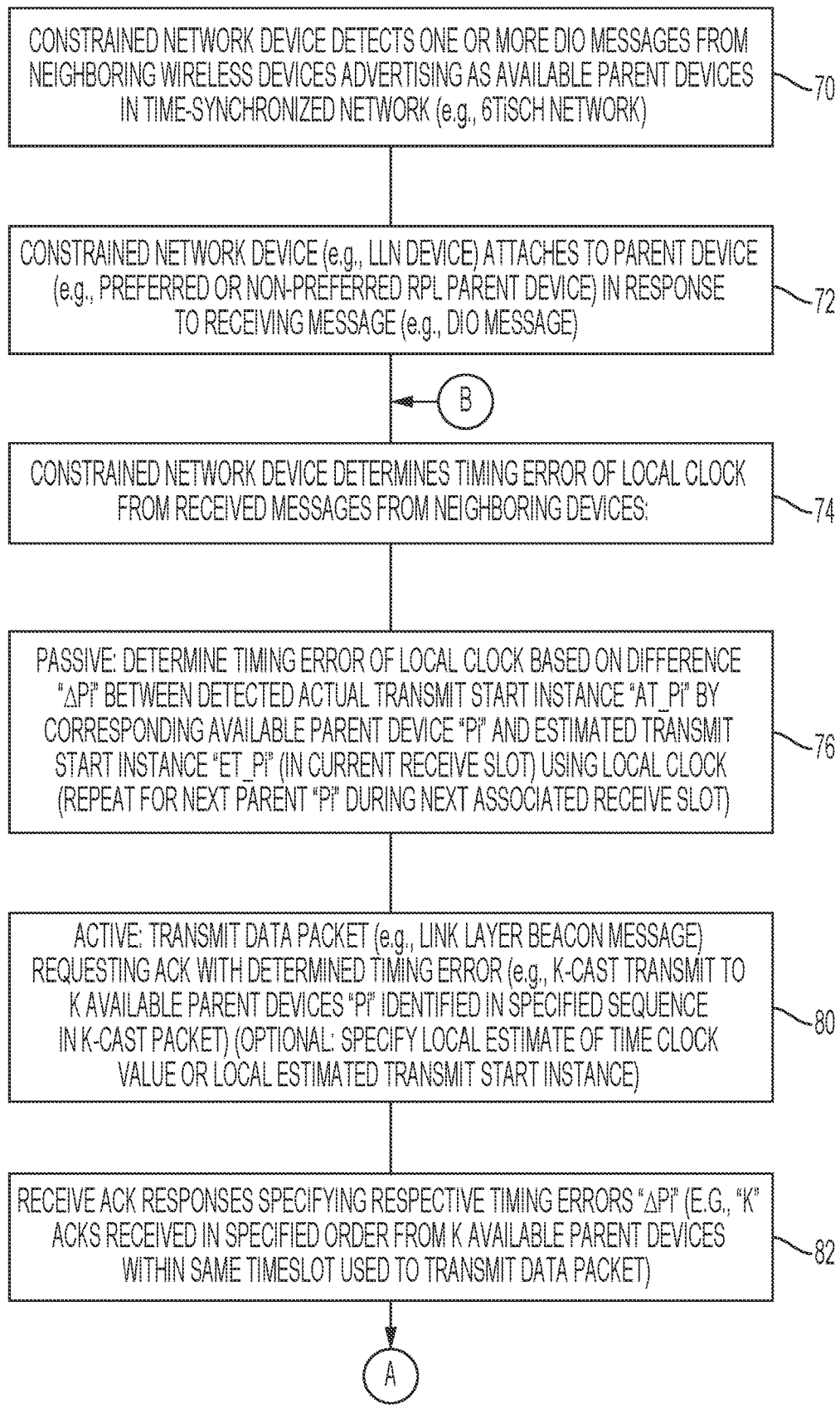
FIGS. 4A-4C illustrate an example method of executing distributed time synchronization based on correlating respective timing errors determined relative to neighboring available parent devices, according to an example embodiment.
Figure 4B:
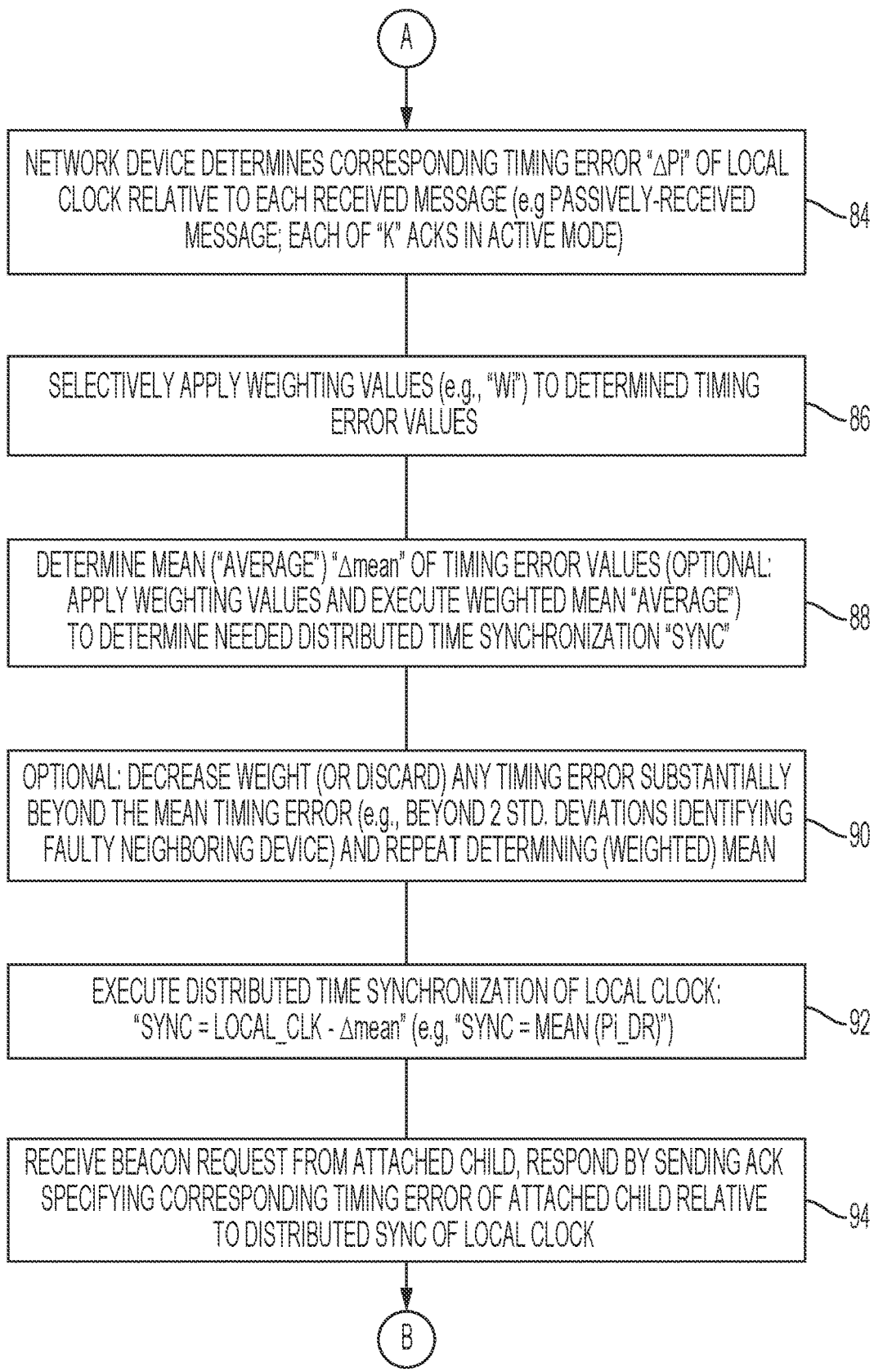
Figure 4C:
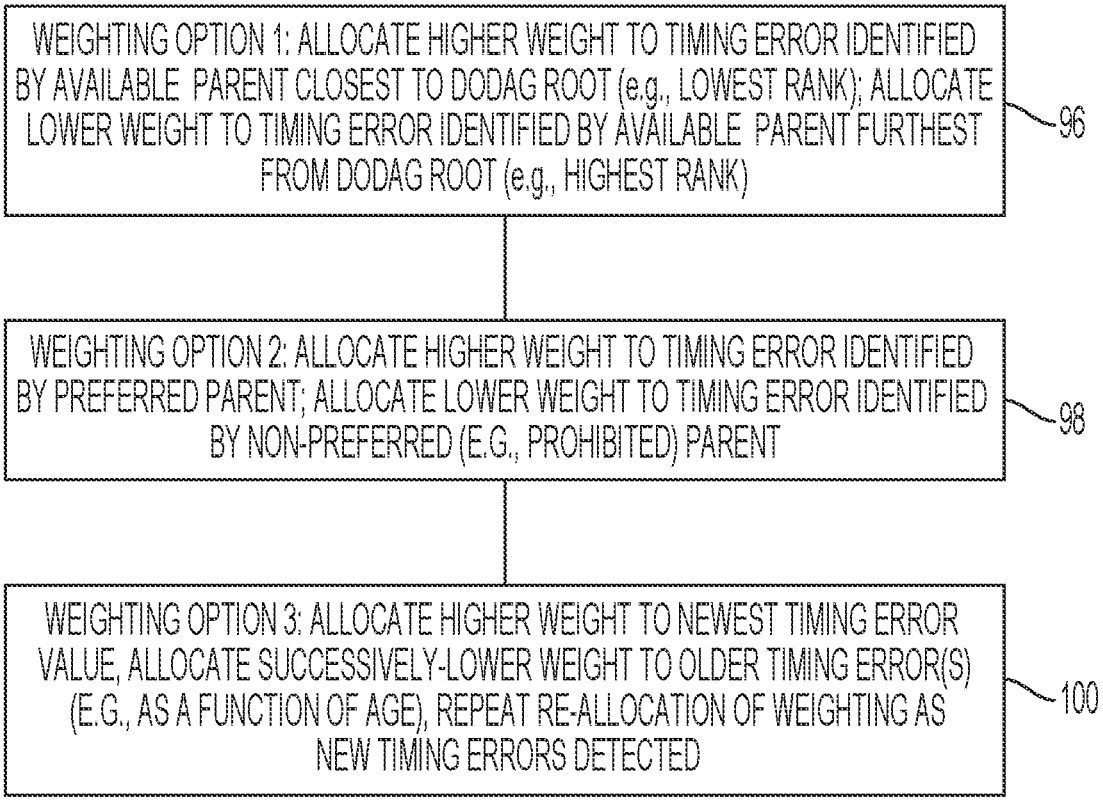

FIGS. 4A-4C illustrate an example method of executing distributed time synchronization based on correlating respective timing errors determined relative to neighboring available parent devices, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the device interface circuit 30 of a constrained network device (e.g., the LLN device "N2" 14 of FIGS. 1A and 1B) in operation 70 can be configured for detecting one or more DIO messages from neighboring wireless devices (e.g., "N1", "N6", "N7") 14 advertising as available parent devices in the time-synchronized wireless mesh data network 10, for example a 6TiSCH network.

In particular, the device interface circuit 30 of the constrained LLN device "N2" 14 can be configured for initially attempting to detect multicast DIO messages at prescribed receive slot times 46, based on synchronizing with a neighboring network device (e.g., the parent LLN device "N1" 14 at a scheduled frequency channel, for example in accordance with TSCH and/or RFC 8180): the constrained LLN device "N2" 14 can synchronize with the neighboring network device in response to detecting, during a prescribed listening interval 42 that is limited by a prescribed guard time (e.g., Packet Guard Time (PGT)) 44, a prescribed transmission activity (e.g., a preamble of a data packet) that is transmitted by a neighboring network device (e.g., the parent LLN device "N1" 14) according to a wireless time-slotted transmission protocol such as IEEE 802.15.4. The device interface circuit 30 of each LLN device 14 and the root network device 12 can be configured for detecting and receiving data packets within a repeatable receive slot interval (i.e., slot frame) 46 of FIG. 3 according to a prescribed schedule established by the PCE/computing device 16 (e.g., according to 6TiSCH).

The processor circuit 32 of the constrained LLN device "N2" 14 can respond to reception of DIO messages from neighboring constrained LLN devices 14 by identifying whether the neighboring constrained LLN device 14, advertising as an available parent device in the DAG 18, can be a potential parent device of the constrained LLN device "N2" 14 based on executing, in accordance with RFC 6550, etc., a prescribed objective function on objective function metrics specified in the received DIO messages, e.g., hop count, rank, etc., and storing the results in a potential parent list in the memory circuit 34.

The processor circuit 32 of the constrained LLN device "N2" 14 in operation 72 can attach to a parent network device (e.g., constrained LLN device "N1" and/or "N6") 14 in response to receiving the DIO message, in accordance with RFC 6550, etc.

The processor circuit 32 of the constrained LLN device "N2" 14 in operation 74 can determine one or more timing errors 24 of its local clock 36 based on received data packets 22 or messages from neighboring devices that are detectable by the device interface circuit 30: as described below, the determining of the timing error 24 in operation 74 can be executed based on transmission and/or reception of data packets 22 at the link layer (e.g. OSI Layer 2), and therefore can be independent and distinct from the constrained LLN device "N2" 14 attaching to any parent network device in the DAG 18; hence, the determining of the timing error 24 in operation 74 can be independent and distinct from the parent selection operations of operation 72, such that the constrained LLN device "N2" 14 can execute operation 74 without having necessarily having "attached" to a parent network device in the DAG 18. The processor circuit 32 of the constrained LLN device "N2" 14 in operation 74, can, however, distinguish between a neighboring LLN device 14 that advertises as an available parent device (e.g., "N1", "N6") and a neighboring LLN device 14 that is unacceptable as an available parent device (e.g., "N2", "N7"), based on objective function metrics specified in the received DIO message (e.g., hop count, rank, etc.) according to RFC 6550, etc. Hence, the constrained LLN device "N2" can avoid formation of timing loops during distributed synchronization by avoiding use of timing error information from neighboring network devices that would be unacceptable parent devices.

The processor circuit 32 of the constrained LLN device "N2" 14 in operation 74 can determine the timing errors 24 of its local clock 36 based on a "passive" timing error detection 76 and/or an "active" timing error detection in operations 80 and 82. In the "passive" example, the processor circuit 32 of the constrained LLN device "N2" 14 in operation 76 can determine a difference "APi" between a detected actual transmit start instance "AT_Pi" (24a of FIG. 3) by a transmitting available parent network device "Pi" within a receive slot time 46, and the estimated transmit start instance "ET_Pi" 76 that was estimated by the constrained LLN device "N2" 14 based on its clock circuit 36 (and any prior synchronizations and/or corrections that may have been applied by the processor circuit 32). The processor circuit 32 of the constrained LLN device "N2" 14 can store in its memory circuit 34 a data structure identifying receive slot time 46 (e.g. by timeslot number), the estimated transmit start instance "ET_Pi" 76, the identity of the transmitting available parent device (e.g., "Pi=N1"), and the determined timing error expressed as the difference "ΔPi" between the estimated transmit start instance "ET_Pi" 76 and the detected actual transmit start instance "AT_Pi" (e.g., "ΔPi=ET_Pi_ΔT_Pi"), or "ΔN1=ET_N1-AT_N1".

The processor circuit 32 of the constrained LLN device "N2" 14 can repeat operation 76 for detection and storage of a second timing error 24b from a different available parent device (e.g., "Pi=N6") during a different receive time slot 46, e.g., "ΔN6=ET_N6-AT_N6". Although the passive example enables the constrained LLN device "N2" to determine its timing errors 24a, 24b relative to different available parent network devices "N1" and "N6", the delay in determining the timing errors 24a, 24b between different receive slot times 46 can result in an inability to correct for any short-term clock drift encountered between the different receive slot times 46 used to determine the respective timing errors 24a and 24b.

Hence, the processor circuit 32 of the constrained LLN device "N2" 14 can execute an "active" timing error detection in operations 80 and 82: the constrained LLN device "N2" 14 in operation 80 can transmit a data packet (e.g., a link layer beacon packet or "beacon message") that specifies, in a prescribed sequence, one or more target network devices (e.g., "N1", "N6") for responding to the data packet (e.g., a "k-cast" data packet requesting timing error information). As described previously with respect to FIG. 3, each target network device (e.g., "N1", "N6") receiving the data packet can determine a corresponding error between expected reception of the data packet at the estimated transmit start instance 76, compared to the actual detected transmit start instance by the constrained LLN device "N2" 14. Hence, the target network device "N1" 14 can determine from its reference the corresponding timing error "ΔN1" 24a of the constrained LLN device "N2" having transmitted the data packet, and the target network device "N6" 14 can determine from its reference the corresponding timing error "ΔN6" 24b of the constrained LLN device "N2" 14 having transmitted the data packet at the same instance in time; hence, each of the target network devices "N1" and "N6" 14 can identify the same instance in time, namely the transmission of the data packet by the constrained LLN device "N2" 14, relative to their corresponding clocks, and determine the corresponding timing error "ΔNi" 24.

In one embodiment, each target network device "N1", "N6" can respond to the data packet transmitted by the constrained LLN device "N2" by transmitting, within the same receive slot time 46 used by the constrained LLN device "N2" 14 to transmit the data packet (within its corresponding transmit slot), an acknowledgment in the prescribed sequence "N1", "N6" specified by the data packet: each acknowledgment can specify the corresponding timing error "ΔNi" 24.

Hence, the device interface circuit 30 of the constrained LLN device "N2" 14 is configured for receiving in operation 82, within the receiver ack transmission interval 54 illustrated in FIG. 3, the acknowledgments 22 from the target devices "N1", "N6", in the specified sequence, specifying the respective timing errors "ΔN1" 24a and "ΔN6" 24b relative to transmission of the data packet by the constrained LLN device "N2".

Hence, the processor circuit 32 of the constrained LLN device "N2" 14 in operation 84 of FIG. 4B can determine, within a single time slot, a corresponding timing error 24 of its local clock relative to each acknowledgment output by the corresponding available parent device "N1" or "N6".

In an alternative embodiment, each target device "N1", "N6" can transmit its corresponding message 22 specifying the corresponding timing error "ΔN1" 24a and "ΔN6" 24b within separate timeslots, as needed depending on implementation; in such cases, the data packet 22 specifying the corresponding timing error 24 can further include a reference to the transmission instance of the originally transmitted data packet by the constrained LLN device "N2" 14, for example a local estimate (by the target device) of the time clock value at the transmission instance, or the locally-estimated transmit start instance 76. As described below with respect to operation 100, a weighting function may be applied for a weighted average based on the relative age of the timing errors determined by a constrained LLN device.

Hence, the processor circuit 32 of the constrained LLN device "N2" 14 can receive in operation 82 the respective timing errors in the respective messages 22, optionally in the prescribed sequence according to the k-cast transmission in operation 80, enabling the processor circuit 32 to determine in operation 84 of FIG. 4A the timing errors identified by the respective data packets 22.

The processor circuit 32 of the constrained LLN device "N2" 14 in operation 86 can selectively apply weighting values (e.g., "Wi" to each of the determined timing error values), and execute a distributed timing synchronization of its local clock relative to the master clock device in the root network device 12, described in further detail below with respect to FIG. 4C.

The processor circuit 32 of the constrained LLN device "N2" 14 in operation 88 can correlate the respective timing errors (e.g., 24a, 24b of FIG. 3), relative to the local clock (illustrated by the estimated transmit start instance 76 in FIG. 3), based on determining a eatistical mean (e.g., "average") "Δmean" 28 of the timing error values (e.g., 24a, 24b) in order to determine the required distributed time synchronization 20. As described in further detail below, processor circuit 32 of the constrained LLN device "N2" 14 in operation 88 can correlate the respective timing errors based on applying a weighted correlation (e.g., weighted mean calculation, weighted average calculation, etc.), that prioritizes certain timing errors.

The processor circuit 32 of the constrained LLN device "N2" 14, in the case of receiving multiple data packets 22 from multiple neighboring devices in a dense network, in operation 90 can reduce the relative influence of any timing error values that substantially deviate (e.g., by two standard deviations "σ" or more) from the determined mean "Δmean" 28, for example due to a neighboring network device suffering from a faulty operation or excessive internal drift. Hence, the processor circuit 32 of the constrained LLN device "N2" 14 in operation 90 can decrease the weight (or discard from calculation) any "bad data" received from a presumably malfunctioning neighboring network device.

The processor circuit 32 of the constrained LLN device "N2" 14 in operation 92 (illustrated as operation 20 in FIGS. 1A, 1B, and 3) can execute the distributed time synchronization of the local clock circuit 36 based on applying a statistical mean (e.g., "average") "Δmean" 28 as a correction to the existing locally-generated clock value "LOCAL_CLK", resulting in the corrected clock value "SYNC=LOCAL_CLK−Δmean", or "SYNC="MEAN (Pi_DR)", where "Pi_DR" is the drift relative to the root (DR) 40 for each available parent "Pi" used by the constrained LLN device "N2" for the distributed synchronization.

As described previously and as illustrated in with respect to FIGS. 1A and 1B, the constrained LLN device "N1" can have a −0.1 millisecond delay (−0.1 ms) relative to its parent, namely the root network device 12, and the constrained LLN device "N6" can have a +0.1 millisecond delay (−0.1 ms) relative to its parent, namely the root network device 12; hence, the processor circuit 32 of the constrained LLN device "N2" 14 in operation 92 can execute the distributed time synchronization of its local clock to align with the master clock device implemented, for example, in the root network device 12: although the calculation "SYNC=MEAN(Pi_DR)" is expressed relative to the master clock device, the equivalent calculation "SYNC="LOCAL_CLK−Δmean" is expressed based on removing the "absolute" clock values in response to determining the difference ("delta" ΔPi) relative to the clock values in the processor circuit 32 of the constrained LLN device "N2" 14 and the neighboring constrained LLN devices.

Following the distributed synchronization in operation 92, the processor circuit 32 of the constrained LLN device "N2" 14 can repeat the distributed synchronization as described above in response to each received message, as appropriate, to update its distributed synchronization over time to correct for internal drift of its clock circuit 36.

Following the distributed synchronization in operation 92, the processor circuit 32 of the constrained LLN device "N2" 14 in operation 94 also can propagate its synchronization to attached child network devices (e.g., "N3" and/or "N7"), further causing synchronization across different branches of the initial tree of FIG. 1A, resulting in the establishment of the "fabric" of synchronization illustrated in FIG. 1B. In particular, the processor circuit 32 of the constrained LLN device "NT" 14 in operation 94 can respond to receiving a beacon request from an attached child network device (as originally transmitted by the processor circuit 32 of the constrained LLN device "N2" 14 in operation 80) by determining the corresponding error of the child network device relative to the synchronized clock "SYNC", and outputting its own data packet 22 specifying the corresponding timing error of the attached child relative to the distributed sync of the local clock.

Hence, as illustrated in FIG. 1B, the distributed synchronization can be propagated "down" the DAG 18, resulting in a synchronized DAG 18' in FIG. 1B. In particular, following the distributed synchronization as described herein, each of the constrained network devices 14 can have the following adjusted drift relative to the root (DR') 40':

TABLE 1

| ADJUSTED DRIFT VALUES RELATIVE TO ROOT (DR') (ms) | |
|---|---|
| N2 | 0 |
| N3 | 0 |
| N4 | +0.1 |
| N5 | +0.05 |
| N7 | −0.1 |
| N8 | 0 |
| N9 | 0 |
| N11 | +0.1 |
| N12 | +0.15 |
| N13 | −0.2 |
| N14 | −0.15 |

Hence, Table 1 and FIG. 1B illustrate that network devices "N4", "N5", "N8", "N9", "N12", "N13", and "N14" improve their adjusted drift relative to the root (DR') 40' sufficiently within the prescribed PGT 44 (1 ms) that these network devices can overcome each prior blockage 60 and/or unreliable communications 62, and establish reliable link layer connections between each other, as illustrated in FIG. 1B, resulting in a synchronized "fabric" and a more stable DODAG topology 18'.

FIG. 4C illustrates example weighting operations that can be performed by the processor circuit 32 of any constrained LLN device 14 in operation 86 of FIG. 4B. For example, the processor circuit 32 of any constrained LLN device 14 in operation 96 can execute a first weighting option, where a higher weight is allocated to a timing error identified by any available parent network device (or neighboring network device) that is closest to the root network device 12, identified for example based on specifying the lowest relative rank (or lowest relative hop count from the root network device 12). The closest available parent device can be allocated a higher weight based on having the "closest synchronization" with the root network device 12, whereas neighboring network devices further from the root network device 12 are expected to have a less accurate synchronization relative to the root network device 12.

For example, the constrained LLN device "N8" can allocate a higher weighting value to a timing error identified by the constrained LLN device "NT", even though policy/objective function rules may be in effect that prevent the constrained network device "N8" from attaching to the constrained LLN device "NT" (e.g., due to attachments limited to a prescribed range of rank values greater than the corresponding rank of the device "NT"). Hence, a network device can still benefit from a "closer" constrained network device, even though the network device cannot attach to the "closer" constrained network device.

The processor circuit 32 of any constrained LLN device 14 in operation 98 can execute a second weighting option, where a higher weight is allocated to a timing error identified by a preferred parent device, and a lower weight is allocated to a timing error identified by a non-preferred (or prohibited) parent. The second weighting of operation 98 can steer the synchronization toward the preferred parent device to ensure reliable communications with the preferred parent devices, while still limiting drift in other branches of the DAG 18.

As described previously, aged timing error values have reduced effectiveness in being able to correct for recent (short-term) drift; hence, as described previously with respect to operation 80, the processor circuit 32 of any constrained LLN device 14 in operation 100 can execute a third weighting option that allocates a higher weight to the most recent timing error, and successively lower weights to older timing errors. The re-allocation of weighting can be repeated over time as new timing errors are detected by the processor circuit 32 of any constrained LLN device 14.

According to example embodiments, network devices in a time-synchronized wireless mesh data network can execute a distributed synchronization based on determining time error values for local clocks relative to each message output by a corresponding available parent device. The distributed synchronization can be distributed throughout the time-synchronized wireless mesh data network, enabling establishment of a "synchronization fabric" in a directed acyclic graph, providing two-dimensional synchronization in the DAG, namely a first dimension of synchronization from the root to its leaves, and a second dimension of synchronization across the first dimension via multiple parent devices utilized by an attached network device.

Although only the network devices "N1", "N6", and "N10" are labeled with the reference numeral "14" in FIGS. 1A-1B to avoid cluttering in the Figures, it should be apparent that all the network devices "N1" through "N14" are allocated the reference numeral "14" for purposes of the description herein. Further, it should be apparent that the root network device 12 and all the network devices "N1" through "N14" 14 are configured for establishing wireless data links 16 (illustrated as curved lines radiating from each device 12 or 14), even though only the wireless data links for the network device "N1" 14 and root network device 12 are labeled with the reference numeral "16" to avoid cluttering in the Figures.

Although only a subset of the devices 12 and 14 in the Figures are illustrated as outputting a data packet 22 to avoid cluttering in the Figures, it should be apparent that all the network devices "N1" through "N14" 12 and the root network device 14 can output a corresponding data packet 22. Further, it should be apparent that all the network devices "N1" through "N14" 12 can have one or more attachments, where each attachment is used to illustrate an optimized next-hop path chosen for an identifiable objective function.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a wireless network device comprising a local clock, a plurality of messages from respective neighboring wireless network devices advertising as available parent devices in a directed acyclic graph of a time-synchronized network that is synchronized to a master clock device;
   determining, by the wireless network device, a corresponding timing error of the local clock relative to each message output by the corresponding available parent device; and
   executing, by the wireless network device, a distributed time synchronization of the local clock with the master clock device based on correlating the respective timing errors relative to the local clock.

2. The method of claim 1, further comprising:
   transmitting, by the wireless network device, a data packet requesting the neighboring wireless network devices to respond, in a specified sequence, with the respective timing errors relative to the local clock;
   the receiving including receiving the messages in the specified sequence, the received messages specifying the respective timing errors each relative to the transmission of the data packet.

3. The method of claim 2, wherein the data packet is transmitted by the wireless network device, and the messages are received by the wireless network device, within a prescribed time slot of the time-synchronized network.

4. The method of claim 1, wherein the correlating includes:
   allocating a higher weighting value to the corresponding timing error associated with a first of the available parent devices having a closest distance to a root of the directed acyclic graph relative to the available parent devices;
   allocating a lower weighting value to the corresponding timing error associated with a second of the available parent devices having a further distance to the root relative to the available parent devices; and
   executing a weighted averaging of the respective timing errors to determine the distributed timing synchronization.

5. The method of claim 1, wherein the correlating includes:
   allocating a higher weighting value to the corresponding timing error associated with a preferred parent of the available parent devices;
   allocating a lower weighting value to the corresponding timing error associated with a non-preferred parent of the available parent devices; and
   executing a weighted averaging of the respective timing errors to determine the distributed timing synchronization.

6. The method of claim 1, wherein the receiving includes receiving the messages during respective receive slots, the correlating including:
   allocating a higher weighting value to a newest one of the timing errors;
   allocating a lower weighting value to an older one of the timing errors; and
   executing a weighted averaging of the respective timing errors to determine the distributed timing synchronization.

7. The method of claim 6, wherein the executing includes repeating the distributed time synchronization in response to each received message in a corresponding receive slot, including reallocating a corresponding lower weighting value to aged ones of the timing errors.

8. The method of claim 1, further comprising:
joining, by the wireless network device, the directed acyclic graph based on attaching to one or more of the available parent devices;
receiving a child message from a child network device having attached to the wireless network device; and
outputting an acknowledgment message in response to receiving the child message, the acknowledgment message specifying a corresponding timing error of the child network device relative to the distributed time synchronization of the local clock of the wireless network device.

9. An apparatus implemented as a physical machine, the apparatus comprising:
non-transitory machine readable media configured for storing executable machine readable code, the apparatus implemented as a wireless network device;
a local clock;
a device interface circuit configured for receiving a plurality of messages from respective neighboring wireless network devices advertising as available parent devices in a directed acyclic graph of a time-synchronized network that is synchronized to a master clock device; and
a processor circuit configured for executing the machine readable code, and when executing the machine readable code operable for:
determining a corresponding timing error of the local clock relative to each message output by the corresponding available parent device, and
executing a distributed time synchronization of the local clock with the master clock device based on correlating the respective timing errors relative to the local clock.

10. The apparatus of claim 9, wherein the processor circuit is configured for:
causing the device interface circuit to transmit a data packet requesting the neighboring wireless network devices to respond, in a specified sequence, with the respective timing errors relative to the local clock;
the device interface circuit configured for receiving the messages in the specified sequence, the received messages specifying the respective timing errors each relative to the transmission of the data packet.

11. The apparatus of claim 10, wherein the data packet is transmitted by the device interface circuit, and the messages are received by the device interface circuit, within a prescribed time slot of the time-synchronized network.

12. The apparatus of claim 9, wherein the processor circuit is configured for:
allocating a higher weighting value to the corresponding timing error associated with a first of the available parent devices having a closest distance to a root of the directed acyclic graph relative to the available parent devices;
allocating a lower weighting value to the corresponding timing error associated with a second of the available parent devices having a further distance to the root relative to the available parent devices; and
executing a weighted averaging of the respective timing errors to determine the distributed timing synchronization.

13. The apparatus of claim 9, wherein the processor circuit is configured for:
allocating a higher weighting value to the corresponding timing error associated with a preferred parent of the available parent devices;
allocating a lower weighting value to the corresponding timing error associated with a non-preferred parent of the available parent devices; and
executing a weighted averaging of the respective timing errors to determine the distributed timing synchronization.

14. The apparatus of claim 9, wherein the device interface circuit is configured for receiving the messages during respective receive slots, and wherein the processor circuit is configured for:
allocating a higher weighting value to a newest one of the timing errors;
allocating a lower weighting value to an older one of the timing errors; and
executing a weighted averaging of the respective timing errors to determine the distributed timing synchronization.

15. The apparatus of claim 14, wherein the processor circuit is configured for repeating the distributed time synchronization in response to each received message in a corresponding receive slot, including reallocating a corresponding lower weighting value to aged ones of the timing errors.

16. The apparatus of claim 9, wherein the processor circuit is configured for:
joining the directed acyclic graph based on attaching to one or more of the available parent devices;
responding to receiving a child message from a child network device having attached to the wireless network device, based on generating and outputting an acknowledgment message specifying a corresponding timing error of the child network device relative to the distributed time synchronization of the local clock of the wireless network device.

17. One or more non-transitory tangible media encoded with logic for execution by a machine and when executed by the machine operable for:
receiving, by the machine implemented a wireless network device comprising a local clock, a plurality of messages from respective neighboring wireless network devices advertising as available parent devices in a directed acyclic graph of a time-synchronized network that is synchronized to a master clock device;
determining, by the wireless network device, a corresponding timing error of the local clock relative to each message output by the corresponding available parent device; and
executing, by the wireless network device, a distributed time synchronization of the local clock with the master clock device based on correlating the respective timing errors relative to the local clock.

18. The one or more non-transitory tangible media of claim 17, further operable for:
transmitting a data packet requesting the neighboring wireless network devices to respond, in a specified sequence, with the respective timing errors relative to the local clock;
the receiving including receiving the messages in the specified sequence, the received messages specifying the respective timing errors each relative to the transmission of the data packet.

19. The one or more non-transitory tangible media of claim 17, wherein the correlating includes:

allocating a higher weighting value to the corresponding timing error associated with a first of the available parent devices having a closest distance to a root of the directed acyclic graph relative to the available parent devices;

allocating a lower weighting value to the corresponding timing error associated with a second of the available parent devices having a further distance to the root relative to the available parent devices; and executing a weighted averaging of the respective timing errors to determine the distributed timing synchronization.

20. The one or more non-transitory tangible media of claim 17, further operable for:

joining, by the wireless network device, the directed acyclic graph based on attaching to one or more of the available parent devices;

receiving a child message from a child network device having attached to the wireless network device; and outputting an acknowledgment message in response to receiving the child message, the acknowledgment message specifying a corresponding timing error of the child network device relative to the distributed time synchronization of the local clock of the wireless network device.

* * * * *

UNITED STATES PATENT AND TRADEMARK OFFICE
CERTIFICATE OF CORRECTION

PATENT NO. : 11,751,156 B2
APPLICATION NO. : 17/369770
DATED : September 5, 2023
INVENTOR(S) : Pascal Thubert et al.

It is certified that error appears in the above-identified patent and that said Letters Patent is hereby corrected as shown below:

In the Specification

Column 15, Line 5, please amend as shown:
FIG. 3), based on determining a statistical mean (e.g., Column 16, Line 4, please amend as shown:
device "N2" 14 in operation 94 can respond to receiving a Column 16, Line 63, please amend as shown:
by the constrained LLN device "N2", even though policy/

Column 16, Line 66, please amend as shown:
constrained LLN device "N2" (e.g., due to attachments Column 17, Line 1, please amend as shown:
corresponding rank of the device "N2"). Hence, a network Signed and Sealed this
Fifth Day of December, 2023

*Katherine Kelly Vidal*
Director of the United States Patent and Trademark Office